United States Patent
Shidai et al.

(10) Patent No.: US 11,392,722 B2
(45) Date of Patent: Jul. 19, 2022

(54) ELECTRONIC CONTROL DEVICE, PROGRAM FALSIFICATION DETECTION METHOD, AND COMPUTER READABLE NON- TRANSITORY TANGIBLE STORAGE MEDIUM

(71) Applicants: DENSO CORPORATION, Kariya (JP); TOYOTA JIDOSHA KABUSHIKI KAISHA, Toyota (JP)

(72) Inventors: Takahiro Shidai, Kariya (JP); Yusuke Satoh, Toyota (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 386 days.

(21) Appl. No.: 16/738,927

(22) Filed: Jan. 9, 2020

(65) Prior Publication Data

US 2020/0151361 A1    May 14, 2020

Related U.S. Application Data

(63) Continuation of application No. PCT/JP2018/023808, filed on Jun. 22, 2018.

(30) Foreign Application Priority Data

Jul. 13, 2017 (JP) .............................. JP2017-136725

(51) Int. Cl.
   *G06F 21/00* (2013.01)
   *G06F 21/64* (2013.01)
   (Continued)

(52) U.S. Cl.
   CPC ............ *G06F 21/64* (2013.01); *G06F 1/3203* (2013.01); *G06F 21/44* (2013.01); *H04L 9/3247* (2013.01)

(58) Field of Classification Search
   CPC ........ G06F 21/64; G06F 1/3203; G06F 21/44; H04L 9/3247
   See application file for complete search history.

(56) References Cited

U.S. PATENT DOCUMENTS 3,763,477 A * 10/1973 Caron .................. H03K 19/168
                                                    365/7
10,075,425 B1 * 9/2018 Waugh .................. H04L 9/3239
(Continued)

FOREIGN PATENT DOCUMENTS

| JP | 2012078953 A | 4/2012 |
|----|--------------|--------|
| JP | 2015022521 A | 2/2015 |

(Continued)

OTHER PUBLICATIONS

Mihir Bellare et al., "XOR MACs: New Methods for Message Authentication Using Finite Pseudorandom Functions," https://cseweb.ucsd.edu/~mihir/papers/xormacs.pdf, p. 3, Feb. 2005.

(Continued)

*Primary Examiner* — Ghodrat Jamshidi
(74) *Attorney, Agent, or Firm* — Harness, Dickey & Pierce, P.L.C.

(57) ABSTRACT

An electronic control device includes: a memory that stores a plurality of divided programs obtained by dividing a program and a verification authenticator, a cryptographic operator that generates a partial authenticator for each of the plurality of divided programs in a cryptographic operation; and a verification unit that generates a operation authenticator by performing a logic operation using the plurality of partial authenticators, and verifies a falsification of the program by determining whether the verification authenticator and the operation authenticator match.

10 Claims, 4 Drawing Sheets

(51) Int. Cl.
  *G06F 1/3203* (2019.01)
  *G06F 21/44* (2013.01)
  *H04L 9/32* (2006.01)

(56) References Cited

U.S. PATENT DOCUMENTS

| | | | | |
|---|---|---|---|---|
| 2003/0145281 | A1* | 7/2003 | Thames | G06F 8/73 |
| | | | | 715/205 |
| 2010/0162352 | A1* | 6/2010 | Haga | G06F 21/51 |
| | | | | 726/2 |
| 2012/0180098 | A1* | 7/2012 | Kim | H04N 21/632 |
| | | | | 725/110 |
| 2014/0136764 | A1* | 5/2014 | Li | G11C 11/5642 |
| | | | | 711/103 |
| 2015/0033016 | A1* | 1/2015 | Thornton | H04L 9/0618 |
| | | | | 713/171 |
| 2015/0074384 | A1* | 3/2015 | Yajima | G06F 21/575 |
| | | | | 713/2 |
| 2015/0124279 | A1 | 5/2015 | Iizuka | |
| 2017/0109546 | A1 | 4/2017 | Nerot | |
| 2017/0372067 | A1* | 12/2017 | Kim | H04L 9/0643 |
| 2018/0096132 | A1 | 4/2018 | Abe | |
| 2018/0373881 | A1* | 12/2018 | Thom | H04L 9/30 |

FOREIGN PATENT DOCUMENTS

| | | |
|---|---|---|
| JP | 2015090682 A | 5/2015 |
| JP | 2017509082 A | 3/2017 |
| WO | WO-2016185577 A | 11/2016 |

OTHER PUBLICATIONS

Yoshito Hirai et al., First Edition issued on Dec. 20, 1994, pp. 1-6 (partial translation).

\* cited by examiner

ELECTRONIC CONTROL DEVICE, PROGRAM FALSIFICATION DETECTION METHOD, AND COMPUTER READABLE NON- TRANSITORY TANGIBLE STORAGE MEDIUM

CROSS REFERENCE TO RELATED APPLICATION

The present application is a continuation application of International Patent Application No. PCT/JP2018/023808 filed on Jun. 22, 2018, which designated the U.S. and claims the benefit of priority from Japanese Patent Application No. 2017-136725 filed on Jul. 13, 2017. The entire disclosures of all of the above applications are incorporated herein by reference.

TECHNICAL FIELD

The present disclosure relates to an electronic control device that detects program falsification, a program falsification detection method, a program for a program falsification detection method, and a computer readable non-transitory tangible storage medium.

BACKGROUND

A control system ECU (i.e., Electronic Control Unit) that controls an engine, a steering wheel, a brake, and the like, a body system ECU that controls a meter, a power window, and the like, and an information system ECU such as a navigation device, which are different types of ECUs, are mounted as an electronic control device in a vehicle. A program for these in-vehicle ECUs mounted on the vehicle includes a program that imposes a severe time restriction at the activation, for example, in order to ensure safety.

SUMMARY

According to an example embodiments, an electronic control device includes: a memory that stores a plurality of divided programs obtained by dividing a program and a verification authenticator, a cryptographic operator that generates a partial authenticator for each of the plurality of divided programs in a cryptographic operation; and a verification unit that generates a operation authenticator by performing a logic operation using the plurality of partial authenticators, and verifies a falsification of the program by determining whether the verification authenticator and the operation authenticator match.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

According to a considerable art, a secure boot method is provided for operating only a required OS (i.e., operation system) or the like against a risk that an OS or the like in an embedded device of a vehicle or the like is falsified by a third party. The secure boot method teaches that a computer executes, at every activation time of a program in a system in order to activate the system safety with high speed, a selection step for selecting a partial program as a verification object among a plurality of partial programs into which the program is divided, an operation step for calculating a hash value of a selected partial program, and a verification step for determining whether a calculated hash value and a proper hash value match, for continuing an activation process when they match, and for interrupting the activation process when they do not match.

As described above, the program region as a verification object is divided into a plurality of program sections, and verification of each program section is executed in turn whether the program section is falsified, thereby all program regions to be verified can be verified with satisfying the activation time restriction.

In the secure boot method, a hash value generated as an authenticator and a proper hash value as a verification authenticator stored in advance for each partial program obtained by dividing a program area in order to satisfy a time restriction at the activation time are compared in order to verify whether the program is falsified.

With new services for providing information from outside to the vehicle via the wireless interface, the opportunity for the vehicle to be connected to the outside increases. For this reason, the risk of falsification of the program in the in-vehicle ECU may increase. Therefore, it is necessary to frequently verify the presence/absence of falsification for safe system activation. For example, in the case of an in-vehicle ECU that activates at the time the battery is connected, the activation is performed only when the battery is connected, so that there is no timing to activate until the next battery connection. Thus, recognition of falsification may be delayed if the program has been falsified during the interval. Therefore, even when wake-up activation from the sleep mode (i.e., when shifting from the low power consumption mode to the normal mode) is performed, it is possible to quickly recognize the falsification by performing the verification of the presence or absence of falsification.

In general, the time restriction at the wake-up activation time from the sleep mode is stricter than the time restriction at the normal activation time. For this reason, in order to satisfy the time restriction at the time of the wake-up activation from the sleep mode, it is necessary to finely divide the program area to be verified into a large number of partial programs.

In the secure boot method, it is necessary to store in advance one verification authenticator (as a proper hash value) for each partial program. For this reason, when the number of partial programs increases, the number of verification authenticators to be stored in the memory area also increases. Therefore, there arises a difficulty that a large number of verification authenticators occupy many regions in a limited storage area (i.e., in a memory).

Thus, an electronic control device is provided such that the device executes a process for detecting a program falsification for each divided program section obtained by dividing a program as a verification object for falsification with satisfying an activation time restriction and for reducing a memory area consumed to store a verification authenticator, and a program falsification detection method, a program for a program falsification detection method, and a computer readable non-transitory tangible storage medium are also provided.

In a first aspect of the present embodiments, an electronic control device includes: a memory that stores a plurality of divided programs obtained by dividing a program and a verification authenticator, a cryptographic operator that generates a partial authenticator for each of the plurality of divided programs in a cryptographic operation; and a verification unit that generates a operation authenticator by performing a logic operation using the plurality of partial authenticators, and verifies a falsification of the program by determining whether the verification authenticator and the operation authenticator match.

In the above electronic control device, the existence or absence of the falsification of the program is verified by determining whether the operation authenticator generated by the logic operation using multiple partial authenticators generated from the divided programs coincides with the verification authenticator generated preliminarily by the same logic operation. With this configuration, the number of verification authenticators stored in advance in the memory is made smaller than the number of divided programs. Therefore, even if the number of divided programs is increased in order to satisfy the activation time restriction, the electronic control device provides a memory area for storing the verification authenticator of which the storage consumption is small.

In the second aspect of the present embodiments, the program falsification detection method includes: generating a partial authenticator for each of a plurality of divided program sections obtained by dividing a program according to a cryptographic operation; generating an operation authenticator according to a logic operation using the plurality of partial authenticators; and determining whether the operation authenticator matches the verification authenticator obtained preliminarily.

In the above program falsification detection method, based on the determination whether the operation authenticator generated by the logic operation using a plurality of partial authenticators generated from the divided program sections matches the verification authenticator generated by performing the same logic operation in advance, the existence or absence of the program falsification is verified. With this configuration, the number of verification authenticators stored in advance is made smaller than the number of divided program sections. Therefore, even if the number of program divided sections is increased to satisfy the activation time restriction, the amount of storage consumption of the memory (i.e., storage) required for storing the verification authenticator is reduced.

In the third aspect of the present embodiments, the program controls a computer to execute a program falsification detection method including: generating a partial authenticator for each of a plurality of divided program sections obtained by dividing the program according to a cryptographic operation; generating a operation authenticator by performing a logic operation using the plurality of partial authenticators; and determining whether the operation authenticator matches a verification authenticator obtained in advance.

In the above program falsification detection method, based on the determination whether the operation authenticator generated by the logic operation using a plurality of partial authenticators generated from the divided program sections matches the verification authenticator generated by performing the same logic operation in advance, the existence or absence of the program falsification is verified. With this configuration, the number of verification authenticators stored in advance is made smaller than the number of divided program sections. Therefore, even if the number of program divided sections is increased to satisfy the activation time restriction, the amount of storage consumption of the memory (i.e., storage) required for storing the verification authenticator is reduced.

In the fourth aspect of the present embodiments, the program controls the computer to execute a program falsification detection method when the electronic control unit is activated, the method including: generating a partial authenticator for each of a plurality of divided program sections obtained by dividing the program according to a cryptographic operation; generating a operation authenticator by performing a logic operation using the plurality of partial authenticators; and determining whether the operation authenticator matches a verification authenticator obtained in advance.

In the above program falsification detection method, based on the determination whether the operation authenticator generated by the logic operation using a plurality of partial authenticators generated from the divided program sections matches the verification authenticator generated by performing the same logic operation in advance, the existence or absence of the program falsification is verified. With this configuration, the number of verification authenticators stored in advance is made smaller than the number of divided program sections. Therefore, even if the number of program divided sections is increased to satisfy the activation time restriction, the amount of storage consumption of the memory (i.e., storage) required for storing the verification authenticator is reduced.

In the fifth aspect of the present embodiments, the program controls the computer to execute a program falsification detection method when the electronic control unit switches from the low energy consumption mode to the normal mode, the method including: generating a partial authenticator for each of a plurality of divided program sections obtained by dividing the program according to a cryptographic operation; generating a operation authenticator by performing a logic operation using the plurality of partial authenticators; and determining whether the operation authenticator matches a verification authenticator obtained in advance.

In the above program falsification detection method, based on the determination whether the operation authenticator generated by the logic operation using a plurality of partial authenticators generated from the divided program sections matches the verification authenticator generated by performing the same logic operation in advance, the existence or absence of the program falsification is verified. With this configuration, the number of verification authenticators stored in advance is made smaller than the number of divided program sections. Therefore, even if the number of program divided sections is increased to satisfy the activation time restriction, the amount of storage consumption of the memory (i.e., storage) required for storing the verification authenticator is reduced.

In the sixth aspect of the present embodiments, in a computer-readable non-transitory tangible storage medium including instructions executed by a computer, the instructions includes: generating a partial authenticator for each of a plurality of divided program sections obtained by dividing the program according to a cryptographic operation; generating a operation authenticator by performing a logic operation using the plurality of partial authenticators; and determining whether the operation authenticator matches a verification authenticator obtained in advance.

The computer-readable non-transitory tangible storage medium provides to verify whether the falsification of the program exists, based on the determination whether the operation authenticator generated by a logic operation using a plurality of partial authenticators generated from a divided program matches a verification authenticator generated by performing the same logic operation in advance. With this configuration, the number of verification authenticators stored in advance is made smaller than the number of divided program sections. Therefore, even if the number of program divided sections is increased to satisfy the activation time restriction, the amount of storage consumption of the memory (i.e., storage) required for storing the verification authenticator is reduced.

FIRST EMBODIMENT

1. Configuration of Electronic Control Device (or ECU)

The configuration of the electronic control device of this embodiment will be described below.

Figure 1:
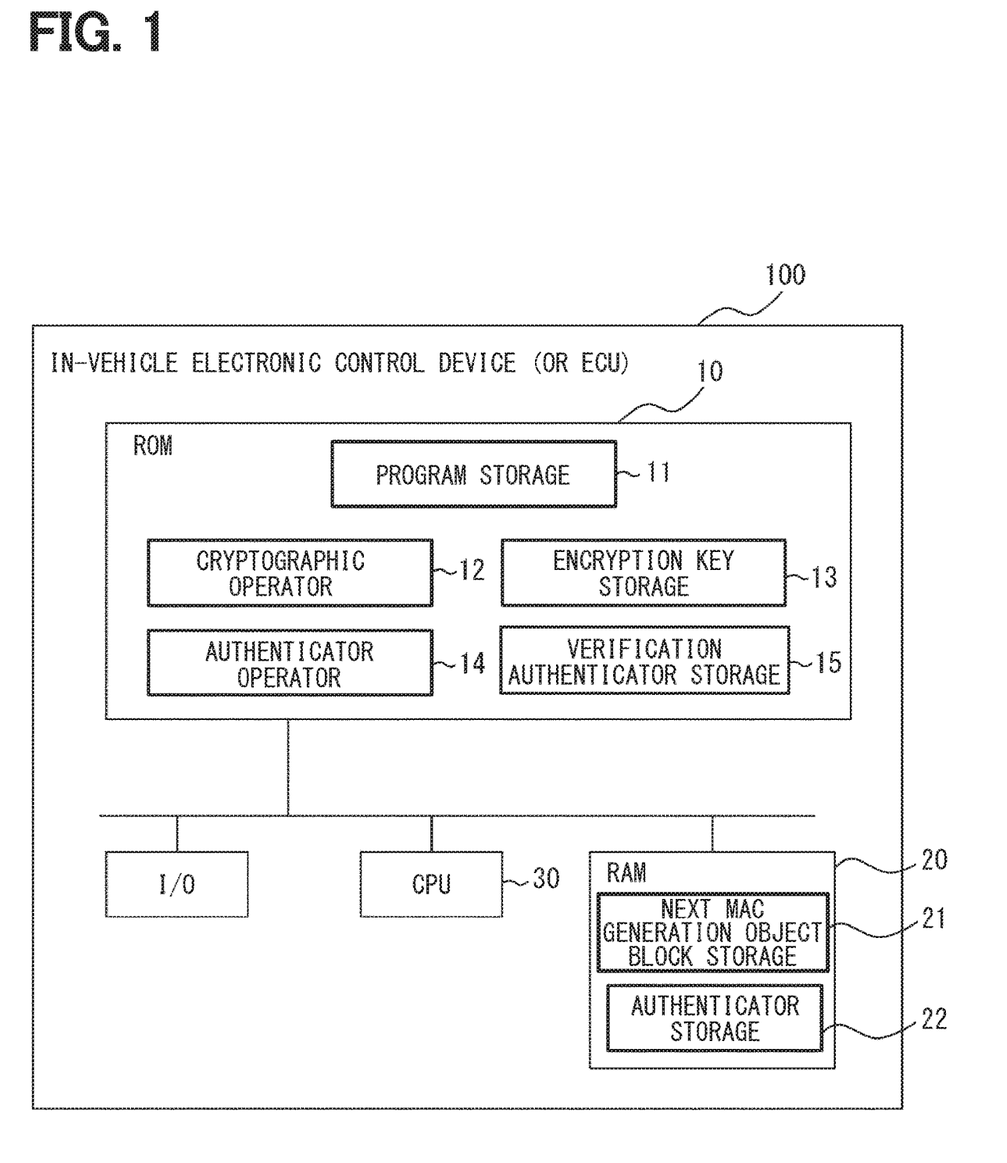
FIG. 1 is a block diagram illustrating a configuration of an electronic control device according to a first embodiment of the present disclosure.

As shown in FIG. 1, an electronic control device 100 includes a ROM (Read Only Memory) 10, a RAM (Random Access Memory) 20, a CPU (Central Processing Unit) 30, a I/O (Input Output), and a bus line for connecting these configurations.

Although the present embodiment mainly describes the use of cryptographic operations using a message authentication code (i.e., MAC), the present disclosure describes operations (i.e., SHA-256) using a HASH function (Hash function) and other operations.

The ROM 10 includes a program storage unit 11 for a falsification check, a cryptographic operation unit 12, an encryption key storage unit 13, an authenticator operation unit 14, and a verification authenticator storage unit 15.

The program storage unit 11 (corresponding to the "a memory" of the present disclosure) stores a program that is a falsification check object as a divided program divided into a plurality of blocks. The number of program divisions may be determined in consideration of the usage of the electronic control device 100, the activation time, and the like.

Note that "division" is not always limited to the division of the program itself as long as the starting point of the program section is specified by, for example, dividing the storage area.

The cryptographic operation unit 12 (corresponding to the "cryptographic operator" of the present disclosure) provides an area in which a cryptographic operation program is stored. The cryptographic operation is performed by a CPU (i.e., a cryptographic operation section) 30 that reads the program in the cryptographic operation unit 12. In the present embodiment, a cryptographic operation program using a message authentication code (MAC) such as CMAC (Cipher-based MAC) is stored in the cryptographic operation unit 12. Examples of cryptographic operations other than MAC include operations (such as SHA-256) using a HASH function. A partial authenticator for each of the plurality of divided program sections is generated by a cryptographic operation.

The encryption key storage unit 13 provides an area in which the encryption key for the MAC operation, which is necessary when the encryption operation unit 12 performs the encryption operation, is stored. When the cryptographic operation unit 12 performs an operation using a HASH function as the cryptographic operation program, the encryption key storage unit 13 need not be used because an encryption key is unnecessary.

The authenticator operation unit 14 (corresponding to the "verification unit" of the present disclosure) provides an area storing a logic operation program for generating an operation authenticator using a plurality of partial authenticators generated for each divided program in the program storage unit 11 for the falsification check. The logic operation is performed by the CPU (or a verification section) 30 that reads the program in the authenticator operation unit 14. The logic operation used in the authenticator operation unit 14 will be described later with reference to FIGS. 2 and 3. Further, the verification of whether the program has been falsified will be described later with reference to FIGS. 2 and 3.

The verification authenticator storage unit 15 (corresponding to the "memory" of the present disclosure) provides an area in which the verification authenticator of the verification target program stored in the program storage unit 11 that is an object for verifying the falsification is stored. The verification authenticator is generated by performing a predetermined cryptographic operation and logic operation in advance for the program in the program storage unit 11.

The electronic control device 100 may be provided with a function (i.e., a reprogram function) capable of rewriting the program storage unit 11 stored in the ROM 10. In this case, since the verification authenticator is changed by rewriting the program storage unit 11, the verification authenticator storage unit 15 also needs to be rewritten. When the reprogram function is provided, there is a high possibility of being connected from the outside, so that the electronic control device 100 is useful since the number of divisions of the program storage unit 11 can be increased without increasing the storage area required for storing the verification authenticator.

The RAM 20 includes a next MAC generation object block storage unit 21 and an authenticator storage unit 22.

The next MAC generation object block storage unit 21 stores information such as a block number, an address in the ROM 10 and the like that can identify a divided program as the next MAC generation object.

Each time an authenticator is generated, a new authenticator is overwritten and stored in the authenticator storage unit 22.

The CPU 30 is a device that executes a program, and executes various programs in the cryptographic operation unit 12 and the authenticator operation unit 14 when verifying the falsification of the program in the program storage unit 11.

2. Falsification Check Process

A program falsification check process performed by the electronic control device 100 having the above-described configuration will be described with reference to FIG. 2.

Figure 2:
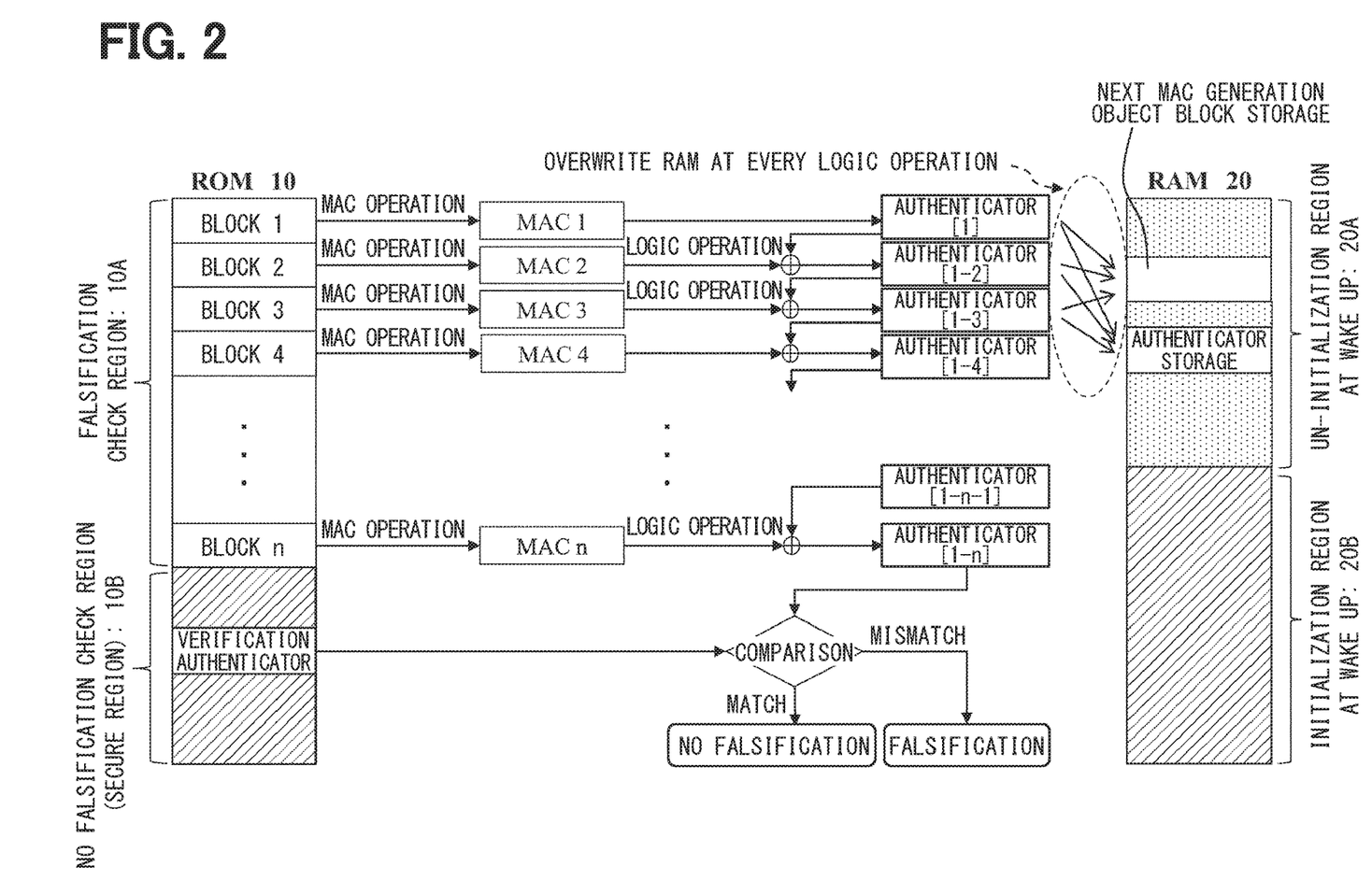
FIG. 2 is an explanatory diagram schematically showing an outline of a program falsification check process by the electronic control device of FIG. 1.

As shown in FIG. 2, in the falsification check process for checking a program written in the program storage unit 11 of the ROM 10, the MAC operation and the logic operation are performed. Hereinafter, the MAC operation and the logic operation will be described in order.

2.1. MAC Operation

The MAC operation is a cryptographic operation using a message authentication code (MAC), and the execution of the program in the cryptographic operation unit 12 is performed using the encryption key in the encryption key storage unit 13 to each divided program in blocks 1 to n in the falsification check area 10A of the ROM 10 as an object. As a result of the MAC operation, MAC1 to MACn (as partial authenticators) are generated for each of the divided program sections of block 1 to block n. The generated MAC has, for example, 128 bits in the case of operation using an AES (Advanced Encryption Standard) 128 encryption algorithm. In the case of operation using the HASH function of SHA (Secure Hash Algorithm)—256, the generated HASH value has 256 bits.

The ROM 10 is divided into a falsification check area 10A in which a program storage unit 11 for storing n partial programs is disposed and a non-falsification check area 10B other than the area 10A.

In the falsification check area 10A, partial programs disposed in blocks 1 to n are stored. Hereinafter, the partial programs in block 1 to block n may be referred to as block 1 to block n as appropriate.

A verification authenticator is stored in the non-falsification check area 10B. The verification authenticator is generated in advance by operation, and the determination whether one of the block 1 to block n is falsified is performed by comparing the verification authenticator with the authenticator [1-$n$] (i.e., the operation authenticator). Thus, the verification authenticator is highly important data. For this reason, the non-falsification check area 10B of the ROM 10 is configured as a secure area. The secure area refers to an area where an access to stored information is difficult and the function of protecting information is high.

FIG. 2 shows an example in which the entire non-falsification check area 10B is configured as a secure area. Alternatively, the non-falsification check area 10B may not be a secure area, but may be an area with an information protection function similar to that of the falsification check area 10A. Alternatively, a part of the non-falsification check area 10B may be a secure area.

Although not shown in FIG. 2, a cryptographic operation unit 12, an encryption key storage unit 13, and an authenticator operation unit 14 (see FIG. 1) are also placed in the non-falsification check area 10B of the ROM 10.

2.2. Logic Operation

When the MACx is calculated by the cryptographic operation of the block x (x is an integer of 2 to n), the logic operation is performed between the authenticator and the MACx stored in the authenticator storage unit 22 of the RAM 20, and the authenticator [1-$x$] is generated and overwritten in the authenticator storage unit 22. At the same time, the block number x+1 for specifying the block x+1 is stored in the next MAC generation object block storage unit 21.

The logic operation includes a logic product (i.e., AND operation), a logic product negation (i.e., NAND operation), a logic sum (i.e., OR operation), a logic sum negation (i.e., NOR operation), an exclusive logic sum (i.e., XOR operation), and an negation of an exclusive logic sum (i.e., XNOR operation that is a match logic). Among these, it is suitable that the exclusive logic sum and the negation of the exclusive logic sum do not converge to one of 0 or 1 by repeating the logic operations because the numerical number of 0s and the numerical number of 1s in the truth table are the same.

2.3. Relationship Between MAC Operation and Logic Operation

The MAC operations and the logic operations are performed as described in Sections 2.1 and 2.2, respectively. Below, the feature will be explained how each of the partial authenticator generated by the MAC operation and the operation authenticator generated by a logic operation is used when the MAC is produced in an order of a block number, in turn along the operation process of the block 1 to block n to which the process is executed in this order.

The MAC 1 of the Block 1 is the partial authenticator which is generated at the beginning. For this reason, when the MAC 1 is generated, a logic operation using a plurality of partial authenticators cannot be performed. Therefore, the MAC 1 of the block 1 is stored in the authenticator storage unit 22 of the RAM 20 as the authenticator [1] (i.e., the operation authenticator). At the same time, the next MAC generation object block in the next MAC generation object block storage unit 21 is set to be 2.

Subsequently, when the MAC 2 of the block 2 is generated, the authenticator [1-2] (i.e., the operation authenticator) generated by performing a logic operation between the authenticator [1] in the authenticator storage unit 22 and the MAC 2 is overwritten and stored in the authenticator storage unit 22. At the same time, the next MAC generation object block in the next MAC generation object block storage unit 21 is set to be 3.

Since the authenticator [1] is the same as the MAC 1, the logic operation of MAC 2 and authenticator [1] is performed using two partial authenticators.

Subsequently, when the MAC 3 of the block 3 is generated, the authenticator [1-3] (i.e., the operation authenticator) generated by performing a logic operation between the authenticator [1-2] in the authenticator storage unit 22 and the MAC 3 is overwritten and stored in the authenticator storage unit 22. At the same time, the next MAC generation object block in the next MAC generation object block storage unit 21 is set to be 4.

Since the authenticator [1-2] is generated by a logic operation using the MAC 1 and the MAC 2, the logic operation of the authenticator [1-2] and the MAC 3 is performed using three partial authenticators MAC 1, MAC 2, and MAC 3. In the present disclosure, the "plurality of partial authenticators" used in the logic operation includes the partial authenticators used in the previous logic operation.

The operation process when the MAC X (X=4 to n−1) of the block X is generated is the same as that of the block 3.

Finally, when the MAC n of the block n is generated, the authenticator [1-$n$] (i.e., the operation authenticator) generated by performing a logic operation on the authenticator [1-$n$-1] of the authenticator storage unit 22 and MAC n is overwritten and stored in the authenticator storage unit 22. At the same time, the next MAC generation object block in the next MAC generation object block storage unit 21 is initialized to be 1.

Since the authenticator [1-$n$-1] is generated by a logic operation using MAC 1 to MAC n−1, the logic operation between the authenticator [1-$n$-1] and the MAC n is performed using all of the partial authenticators MAC 1 to MAC n.

The authenticator [1-$n$] is an operation authenticator generated as a result of a logic operation performed using all of MAC 1 to MAC n (as the partial authenticators) of block 1 to block n. Therefore, when any of the blocks 1 to n is falsified, the falsification is reflected on the authenticator [1-$n$] via any of the MAC 1 to MAC n. Therefore, when there is a falsification, the authenticator [1-n] does not match the verification authenticator obtained in the previous operation.

Therefore, comparing the authenticator [1-n] with the verification authenticator, it can be determined that the program has been falsified when they do not match, and that the program has not been falsified when they match. When it is determined by the comparison that the program has been falsified, the activation of the electronic control device 100 (see FIG. 1) is stopped or a warning is displayed.

The electronic control device 100 performs an operation using all of MAC 1 to MAC n to generate an authenticator [1-n] (i.e., the operation authenticator), compares it with the verification authenticator, and determines the existence or absence of the falsification of the program in the program storage unit 11 (FIG. 1). Therefore, it is sufficient to store one verification authenticator in the verification authenticator storage unit 15 of the ROM 10.

Therefore, the memory capacity for storing the verification authenticators having the numerical number of n−1 which is calculated by subtracting one from the number of the blocks, i.e., n, is reduced, compared with a conventional case where it is necessary to prepared the verification authenticators with the same numerical number as the number of blocks in order to verify the falsification of each divided block in the program.

For example, when 128-bit partial authenticators as MAC 1 to MAC n are used, the memory size of (n−1)×128 bits can be reduced. According to the electronic control device 100, the effect of reducing the storage capacity of the ROM 10 becomes higher as the number of divisions of the program as the falsification verification object increases. The increase in the number of program divisions is effective for preventing the previous process from being wasted when the activation process is interrupted, and for shortening the activation process time of the electronic control device 100.

FIG. 2 shows the case where there is one verification authenticator. Thus, usage of one verification authenticator is preferable from the viewpoint of reducing the memory capacity of the verification authenticator storage unit 15 in the ROM 10.

Alternatively, the number of verification authenticators stored in the verification authenticator storage unit 15 may not be limited to one. A plurality of verification authenticators may be used. When multiple verification authenticators are used, the blocks 1 to n are divided into multiple groups, and one verification authenticator for each group is stored in the ROM 10 in advance. Then, a verification authenticator is generated by a logic operation using all the partial authenticators of each group, and the authenticator is compared with the verification authenticator to determine whether the divided program included in the group is falsified.

When the calculation of the authenticator [1] to the authenticator [1-n] cannot be performed continuously at one time, the falsification check process is interrupted during the cryptographic operation or the logic operation. In this case, the authenticator storage unit 22 stores an authenticator (i.e., the operation authenticator) obtained by the falsification check process until being interrupted. The next MAC generation object block storage unit 21 stores a block as a MAC generation object after the logic operation for which the authenticator is obtained. Therefore, it is possible to restart from the next cryptographic operation next to the logic operation for generating the authenticator in the falsification check process until cancellation. Since the authenticator in the authenticator storage unit 22 can be used in the logic operation following the restarted cryptographic operation, the results of the cryptographic process and the logic operation on the block that has been completed before being interrupted can be used effectively.

Therefore, by dividing the program and performing the falsification check process, it is possible to reduce the time required for the program verification.

The RAM 20 includes a non-initialized area 20A that is not initialized and an initialized area 20B that is initialized when the low power consumption mode is switched to the activation of the normal mode (i.e., Wake Up activation). A next MAC generation object block storage unit 21 and an authenticator storage unit 22 are placed in the non-initialized area 20A. Therefore, the information written in the next MAC generation object block storage unit 21 and the authentication unit storage unit 22, which are rewritten every time the authenticators 1 to [1-n] are calculated, is maintained when the Wake Up activation is executed. Therefore, when a restart of the activation occurs during the calculation of authenticator 1 to authenticator [1-n], the falsification check process can be restarted based on the information in the next MAC generation object block storage unit 21 and the authenticator storage unit 22 recorded before the restart.

When the area where the next MAC generation object block storage unit 21 and the authenticator storage unit 22 are stored is an area that is not initialized when the Wake Up activation starts, it can be quickly restarted from the interruption of the falsification check process. Therefore, the next MAC generation object block storage unit 21 and the authenticator storage unit 22 may be stored in a rewritable non-volatile memory such as EEPROM or Data Flash memory. Since the processing speed of the RAM 20 is faster than the exemplified nonvolatile memory, the exemplified nonvolatile memory can be used only when the time restriction at the activation time of the electronic control device 100 is satisfied.

The present disclosure may also be applied to an electronic control unit including a plurality of electronic control devices. An electronic control unit having a plurality of electronic control devices is often used in combination with electronic control devices that have different time restrictions at the time of activation. Therefore, it is preferable to vary the number of divisions of the division program stored in the memory according to the usage purpose of a plurality of electronic control devices and the time restrictions during movement. Accordingly, it is possible to suppress the memory consumption of the entire storage unit in the electronic control unit while satisfying the restrictions on the activation times of the electronic control devices.

3. Program Falsification Detection Method

A program falsification detection process performed by the electronic control device 100 described above will be described with reference to FIG. 3.

Figure 3:
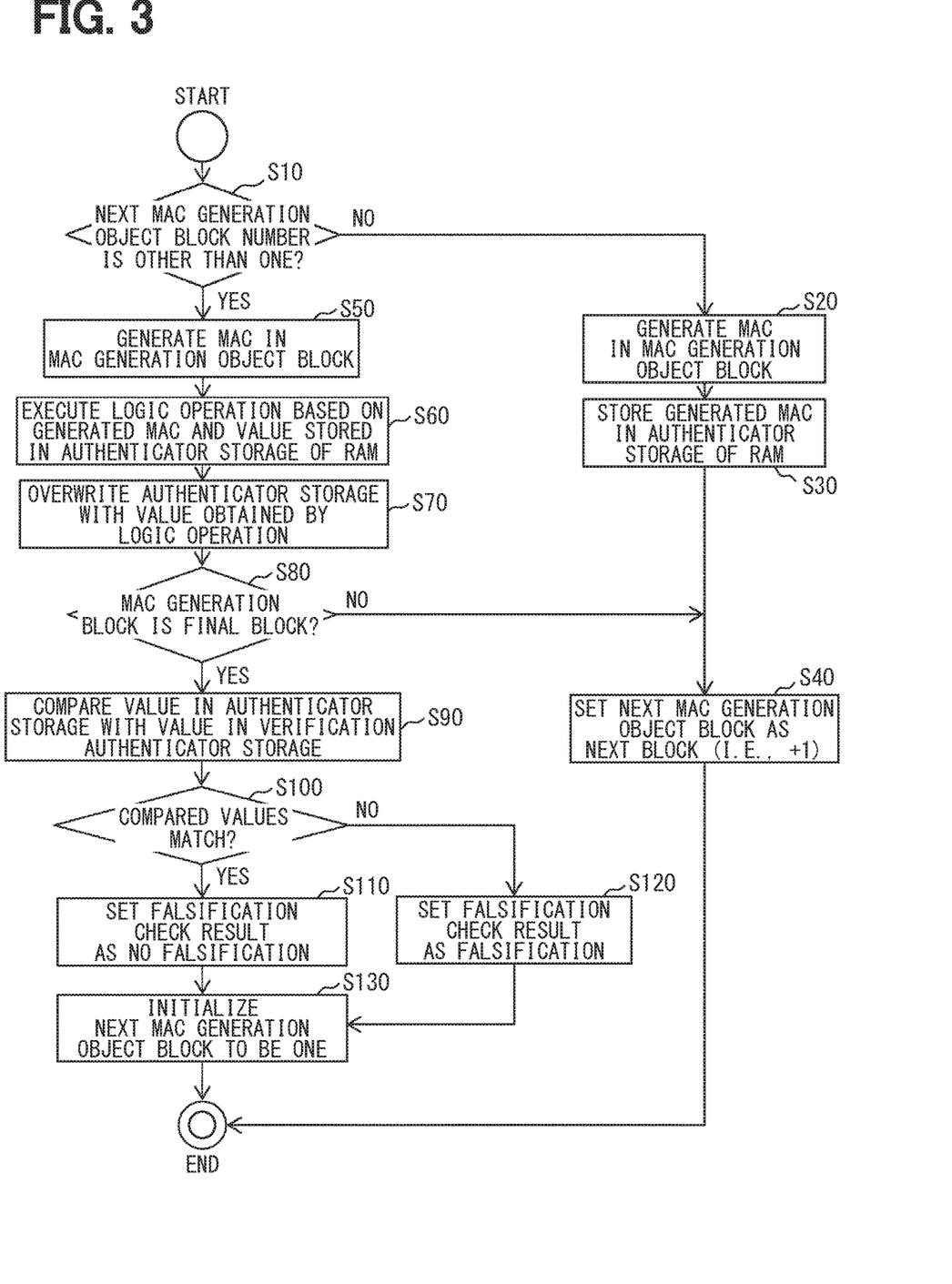
FIG. 3 is a flowchart for explaining the operation of the electronic control device of FIG. 1.

In the program falsification detection method, the CPU 30 reads and executes the programs of the cryptographic operation unit 12 and the authenticator operation unit 14 (see FIG. 1), and the programs are read out when the electronic control device 100 is activated or when the low power consumption mode is switched to the normal mode. The low power consumption mode refers to a state in which the electronic control device 100 does not perform a part of the process executed in the normal mode, and the power consumption is smaller than that in the normal mode. The sleep mode in which the program being executed is stored in the memory and temporarily stopped is an example of the low power consumption mode.

In S10, it is determined whether the block number is other than 1 by referring to the block number recorded in the next MAC generation object block storage unit 21 of the RAM 20. When the block number of the next MAC generation object block storage unit 21 is not other than 1 (i.e., when the number is 1, that is "NO" at S10), the process proceeds to S20 (i.e., a cryptographic operation step), and the block number of the next MAC generation object block storage unit 21 is other than 1 (i.e., when the number is not 1, that is "YES" at S10), the process proceeds to S50 (i.e., a cryptographic operation step).

In S20, MAC1 of the divided program of block 1, which is a MAC generation object block, is generated, and the process proceeds to S30.

In S30, MAC1 generated in S20 is stored in the authenticator storage unit 22 of the RAM 20 as an authenticator, and the process proceeds to S40 (authenticator calculation step).

In S40, the block number obtained by adding 1 to the block number of the partial program that provides the MAC in S20 is written (set) in the next MAC generation object block storage unit 21 of the RAM 20 as the next MAC generation object block. Then, the process ends.

In S50, a MACx of a divided program having a block number x (here, x is an integer of 2 to n), which is a MAC generation object block, is generated, and the process proceeds to S60 (i.e., an authenticator operation step).

In S60, the authenticator operation unit 14 performs a logic operation on the MAC generated in S50 and the authenticator [1-(x-1)] stored in the authenticator storage unit 22 of the RAM 20, and the authenticator [1-(x)] is calculated, and the process proceeds to S70.

In S70, the generated authenticator [1-x] is stored in the authenticator storage unit 22 of the RAM 20, and the process proceeds to S80.

In S80, it is determined whether the block in which the MAC is generated in S50 is the last block, that is, whether the block number x of the block in which the MAC is generated is equal to the number n of blocks in the divided program (i.e., whether x=n).

When x=n (i.e., "Yes" at S80), the authenticator [1-$n$] stored in the authenticator storage unit 22 in S70 is obtained as a result of the logic operation using the partial authenticators of all the divided programs. Thus, it can be used as a verification authenticator for verifying whether a falsified program is included in all the divided programs. Therefore, the process proceeds to S90 (i.e., a verification step).

When "x=n" is not true, the process proceeds to S40.

In S90, the authenticator [1-$n$] stored in the authenticator storage unit 22 is compared with the verification authenticator stored in the verification authenticator storage unit 15.

In S100 (i.e., the verification step), it is determined whether the values compared in S90 match.

When they match (i.e., "YES" at S100), the process proceeds to S110. When they do not match (i.e., "NO" at S100), the process proceeds to S120.

In S110, the falsification check result is set to be absence of falsification, and the process proceeds to S130.

In S120, the falsification check result is set to be existence of falsification, and the process proceeds to S130.

At S130, the block number in the next MAC generation object block storage unit 21 is initialized to be 1. Then, the process ends.

The present disclosure can also be implemented as a program that causes a computer to execute the program falsification detection method described above. The program is executed when the electronic control device is activated or when the low power consumption mode is shifted to the normal mode.

As described above, according to the electronic control device of the present embodiment, the device detects the existence or absence of the falsification of the program using the operation authenticator, obtained by performing a logic operation using a plurality of partial authenticators instead of each partial authenticator itself required for each divided program obtained by dividing the program, as a comparison target of the verification authenticator. As a result, the number of verification authenticators to be stored can be reduced, and mass consumption of the ROM can be suppressed.

SECOND EMBODIMENT

An embodiment in which the present disclosure is applied to an electronic control device (ECU) that uses a security chip will be described.

Figure 4:
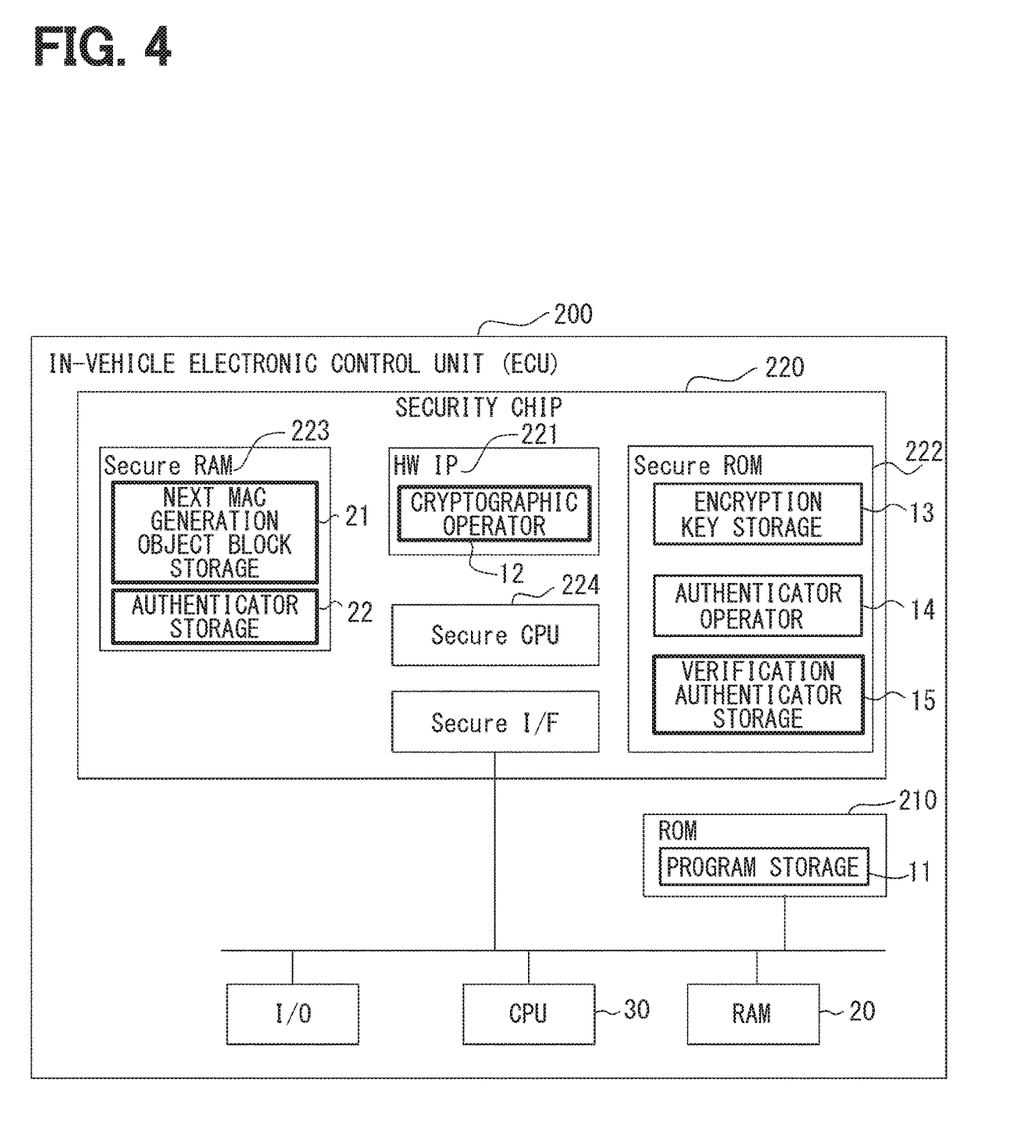
FIG. 4 is a block diagram illustrating a configuration of an electronic control device according to a second embodiment of the present disclosure.

As shown in FIG. 4, the electronic control device 200 according to the present embodiment includes a ROM 210, a security chip 220, a RAM 20, a CPU 30, a I/O, and a bus line that connects these configurations.

The electronic control device 200 is different from the electronic control device 100 in a configuration including a ROM 210 and a security chip 220 instead of the ROM 10. In the components of the ROM 10, only the program storage unit 11 is disposed in the ROM 210. The components other than the program storage unit 11 are arranged in the security chip 220 having high tamper resistance (i.e., difficulty of analyzing stored data).

The security chip 220 includes a secure (Secure) CPU 224, a secure (Secure) RAM 223, a secure interface (Secure I/F), a hardware IP module (HWIP) 221, and a secure (Secure) ROM 222. The hardware IP module 221 has the cryptographic operation unit 12. The secure ROM 222 includes an encryption key storage unit 13, an authenticator operation unit 14, and a verification authenticator storage unit 15. The secure (Secure) RAM 223 includes a next MAC generation object block storage unit 21 and an authenticator storage unit 22. In the first embodiment, the various cryptographic operations in FIG. 2 and the processes in the flow in FIG. 3 are executed by the CPU 30, but in this embodiment, the secure CPU 224 executes them.

As described above, the security chip 220 stores a program (and temporary data such as a operation authenticator and a next MAC generation object block), an encryption key, and a verification authenticator used for verifying whether the program has been falsified. Thus, access to these programs (and the temporary data), the encryption key, and the verification authenticator can be prevented.

Examples of the electronic control device according to the present disclosure include a semiconductor device, an electronic circuit, a module, and a microcomputer. In addition, necessary functions such as an antenna and a communication interface may be added to these devices. Moreover, it may be also possible to provide features such as a car navigation system, a smartphone, a personal computer, and a portable information terminal.

In addition, the present disclosure can be realized not only by the above-described special purpose hardware, but also by a program recorded in a storage medium such as a memory or a hard disk, and by a combination with a general purpose hardware having a dedicated or general-purpose CPU and a memory for executing the program.

Programs stored in storage areas of dedicated or general-purpose hardware (i.e., hard disk, USB memory, etc.) or in internal storage devices (i.e., RAM, ROM, etc.) can be provided, via a storage medium or via a communication line from a server without a storage medium, to the above-described dedicated or general-purpose hardware (corresponding to the "computer" of the present disclosure). Consequently, when the program is upgraded, the latest function is always provided.

The electronic control device according to the present disclosure can be used as an in-vehicle electronic control device (or ECU). Alternatively, electronic control devices other than those for vehicles may be also covered by the present disclosure.

Here, the process of the flowchart or the flowchart described in this application includes a plurality of sections (or steps), and each section is expressed as, for example, S10. Further, each section may be divided into several subsections, while several sections may be combined into one section. Furthermore, each section thus configured may be referred to as a device, module, or means.

Although the present disclosure is described based on the above embodiment, the present disclosure is not limited to the embodiment and the structure. The present disclosure encompasses various modifications and variations within the scope of equivalents. In addition, various combinations and forms, and further, other combinations and forms including only one element, or more or less than these elements are also within the scope and the scope of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

What is claimed is:

1. An electronic control device comprising:
a memory that stores a plurality of divided programs with a total number of m obtained by dividing a program, and stores a verification authenticator;
a cryptographic operation unit that generates a plurality of partial authenticators with a total number of m for the plurality of divided programs, respectively, by a cryptographic operation;
an authenticator operation unit that generates a n-th operation authenticator by performing a logic operation using a n-th partial authenticator and a (n−1)-th operation authenticator which is generated by performing the logic operation using first to (n−1)-th partial authenticators;
an authenticator storage unit that stores the n-th operation authenticator;
a next generation object storage unit that stores information for specifying one of the divided programs that generates a (n+1)-th partial authenticator; and
a verification unit that verifies a falsification of the program by determining whether the verification authenticator matches a m-th operation authenticator, wherein:
the cryptographic operation unit, the authenticator operation unit and the verification unit are provided by a processor and;
wherein the logic operation performed by the authenticator operation unit includes an exclusive disjunction or negation of an exclusive disjunction;
the exclusive disjunction is defined as an XOR operation; and
the negation of exclusive disjunction is defined as an XNOR operation.

2. The electronic control device according to claim 1, wherein:
the authenticator storage unit is provided by another memory; and
the next generation object storage unit is provided by a further another memory.

3. The electronic control device according to claim 1, wherein:
the cryptographic operation unit generates the n-th partial authenticator after the authenticator operation unit generates the (n−1)-th operation authenticator;
the authenticator operation unit generates the n-th operation authenticator by performing the logic operation using the n-th partial authenticator and the (n−1)-th operation authenticator stored in the authenticator storage unit; and
the authenticator storage unit overwrites the (n−1)-th operation authenticator with the n-th operation authenticator to store the n-th operation authenticator.

4. The electronic control device according to claim 1, wherein:
the memory stores one verification authenticator;
the authenticator operation unit performs the logic operation using all the partial authenticators to generate one operation authenticator; and
the verification unit verifies an existence or absence of the falsification of the program by determining whether the one verification authenticator matches the one operation authenticator.

5. A program falsification detection method comprising:
generating a plurality of partial authenticators with a total number of m for a plurality of divided programs with a total number of m obtained by dividing a program, respectively, according to a cryptographic operation;
generating a n-th operation authenticator by performing a logic operation using a n-th partial authenticator and a (n−1)-th operation authenticator which is generated by performing the logic operation using first to (n−1)-th partial authenticators obtained in the generating of the plurality of partial authenticators;
wherein the logic operation includes an exclusive disjunction or negation of an exclusive disjunction;
the exclusive disjunction is defined as an XOR operation; and the negation of exclusive disjunction is defined as an XNOR operation;

storing the n-th operation authenticator;

storing information for specifying one of the divided programs that generates a (n+1)-th partial authenticator; and verifying a falsification of the program by determining whether a m-th operation authenticator matches a verification authenticator obtained preliminarily.

6. The program falsification detection method according to claim 5, wherein:

when an electronic control device is activated, the generating of the partial authenticators, the generating of the n-th operation authenticator, the storing of the n-th operation authenticator, the storing of the information and the verifying are performed.

7. The program falsification detection method according to claim 5, wherein:

when an electronic control device switches from a low power consumption mode to a normal mode, the generating of the partial authenticators, the generating of the n-th operation authenticator, the storing of the n-th operation authenticator, the storing of the information and the verifying are performed.

8. A computer readable non-transitory tangible storage medium including instructions executed by a computer, the instructions comprising:

generating a plurality of partial authenticators with a total number of m for a plurality of divided programs with a total number of m obtained by dividing a program, respectively, according to a cryptographic operation;

generating a n-th operation authenticator by performing a logic operation using a n-th partial authenticator and a (n−1)-th operation authenticator which is generated by performing the logic operation using first to (n−1)-th partial authenticators obtained in the generating of the plurality of partial authenticators;

wherein the logic operation includes an exclusive disjunction or negation of an exclusive disjunction;

the exclusive disjunction is defined as an XOR operation; and the negation of exclusive disjunction is defined as an XNOR operation;

storing the n-th operation authenticator;

storing information for specifying one of the divided programs that generates a $(n_+1)$-th partial authenticator; and verifying a falsification of the program by determining whether a m-th operation authenticator matches a verification authenticator obtained preliminarily.

9. The computer readable non-transitory tangible storage medium according to claim 8, wherein:

when an electronic control unit is activated, the computer executes the instructions.

10. The computer readable non-transitory tangible storage medium according to claim 8, wherein:

when an electronic control device switches from a low power consumption mode to a normal mode, the computer executes the instructions.

* * * * *